(12) United States Patent
Baudry et al.

(10) Patent No.: US 7,299,476 B2
(45) Date of Patent: Nov. 20, 2007

(54) METHOD FOR EXCHANGING INFORMATION BETWEEN OPERATING SYSTEMS COEXISTING ON THE SAME COMPUTER

(75) Inventors: Robert Baudry, Saint Germain en Laye (FR); Michel LeCampion, Menilles (FR); Michel Tuilliere, Bourg le Reine (FR)

(73) Assignee: Bull, S.A., Les Clayes Sous Bous (FR)

( * ) Notice: Subject to any disclaimer, the term of this patent is extended or adjusted under 35 U.S.C. 154(b) by 489 days.

(21) Appl. No.: 10/445,325

(22) Filed: May 27, 2003

(65) Prior Publication Data

US 2004/0064521 A1    Apr. 1, 2004

(30) Foreign Application Priority Data

May 24, 2002    (FR) .................................. 02 06364

(51) Int. Cl.
*G06F 9/44*    (2006.01)
*G06F 9/46*    (2006.01)

(52) U.S. Cl. ...................... 719/312; 719/313; 719/319; 709/213

(58) Field of Classification Search ................ 719/319, 719/312
See application file for complete search history.

(56) References Cited

U.S. PATENT DOCUMENTS

| | | | |
|---|---|---|---|
| 4,993,017 A | | 2/1991 | Bachinger et al. |
| 5,408,617 A | * | 4/1995 | Yoshida .................. 719/319 |
| 5,680,586 A | * | 10/1997 | Elkins et al. .................. 703/27 |
| 6,314,501 B1 | * | 11/2001 | Gulick et al. ................ 711/153 |
| 6,519,623 B1 | * | 2/2003 | Mancisidor ................. 718/100 |
| 6,542,926 B2 | * | 4/2003 | Zalewski et al. ............ 709/213 |
| 7,127,723 B2 | * | 10/2006 | Endo et al. ................... 719/319 |

(Continued)

FOREIGN PATENT DOCUMENTS

EP        1162536 A        12/2001

(Continued)

OTHER PUBLICATIONS

Bugnion et al., Disco: running commodity operating systems on scalable multiprocessors, ACM Transactions on Computer Systems vol. 15, Issue Nov. 4, 1997 pp. 412-447.*
Ramamrithan et al., Scheduling algorithms and operating systems support for real-time systems, Proceedings of the IEEE Publication Date: Jan. 1994 vol. 82 , Issue: On pp. 55-67.*

(Continued)

*Primary Examiner*—William Thomson
*Assistant Examiner*—Abdou K Seye
(74) *Attorney, Agent, or Firm*—Miles & Stockbridge P.C.; Edward J. Kondracki

(57) ABSTRACT

The present invention concerns a method for exchanging information between processes, tasks or computer applications executed by different operating systems coexisting on the same computer or the same hardware platform. This method allows communication between at least two client processes executed at the same time in a hardware platform (10) comprising one or more processors and storage means, at least part of which constitutes an addressable memory area that can be used as a working memory. These client processes are executed in two different operating systems (respectively) that are not directly compatible with one another. The method is characterized in that these the client processes write or read or modify information called exchange data in at least one common part, of the addressable memory of the hardware platform. The common part comprises an exchange memory.

33 Claims, 5 Drawing Sheets

U.S. PATENT DOCUMENTS

2003/0088604 A1* 5/2003 Kuck et al. .................. 709/1

FOREIGN PATENT DOCUMENTS

WO      WO 97 01944 A     1/1997

OTHER PUBLICATIONS

Emmanuel Chailloux: Systemes a memoire Partagee Internet document, "On Line", Nov. 15, 1998, XP002240830, Extract from the Internet: URL:http://www.pps.jussieu.fr/[emmanuel/Public/enseignement/POD_98_WWW/pw6/nodel.html; extract of May 12, 2003—Entire Document.

Marc Shapiro: "Soul: An Object-Oriented OS Framework for Object Support" Internet document: Workshop on Operating Systems for the Nineties and Beyond "On Line", May 1, 1991, XP002240831; Abstract, p. 2, line 10-line 23; p. 2, line 29-p. 3, line 9, p. 4, line 23-26.

Bob Beck: AAMP: A Multiprocessor Approach for Operating System and Application Migration: Operating Systems Review ACM HQ, NY, vol. 24, No. 2, Apr. 1, 1990, pp. 41-55, XP000140419, p. 43, Last Par.—p. 44, Line 15, p. 45, Line 19-p. 47, Line 47; p. 52, Line 21-24.

* cited by examiner

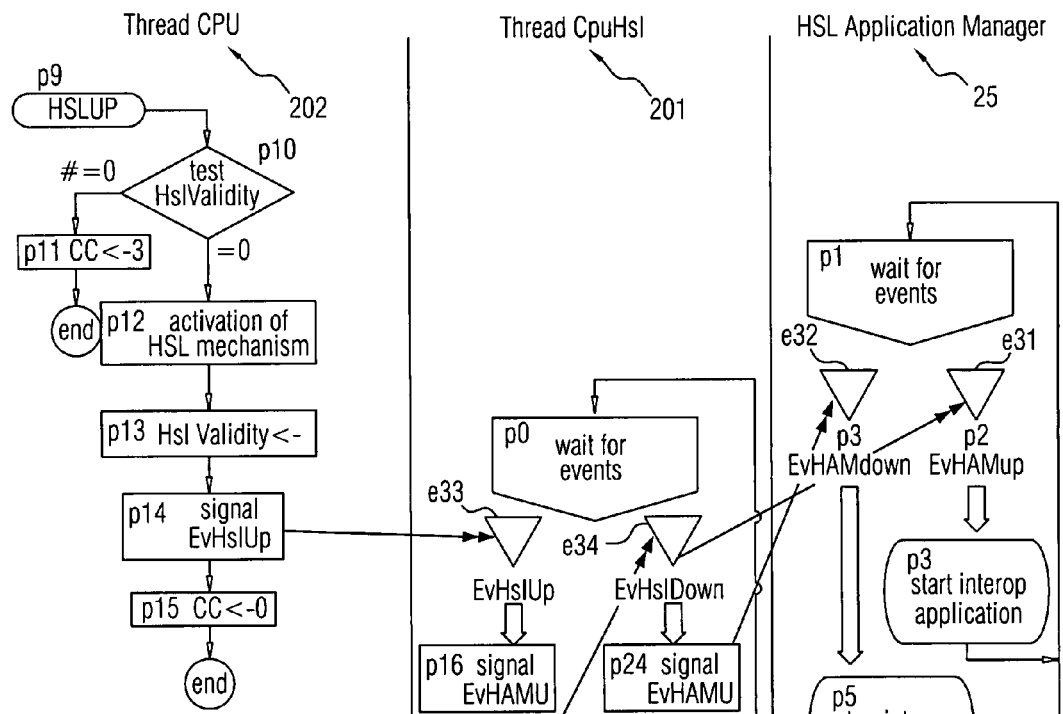
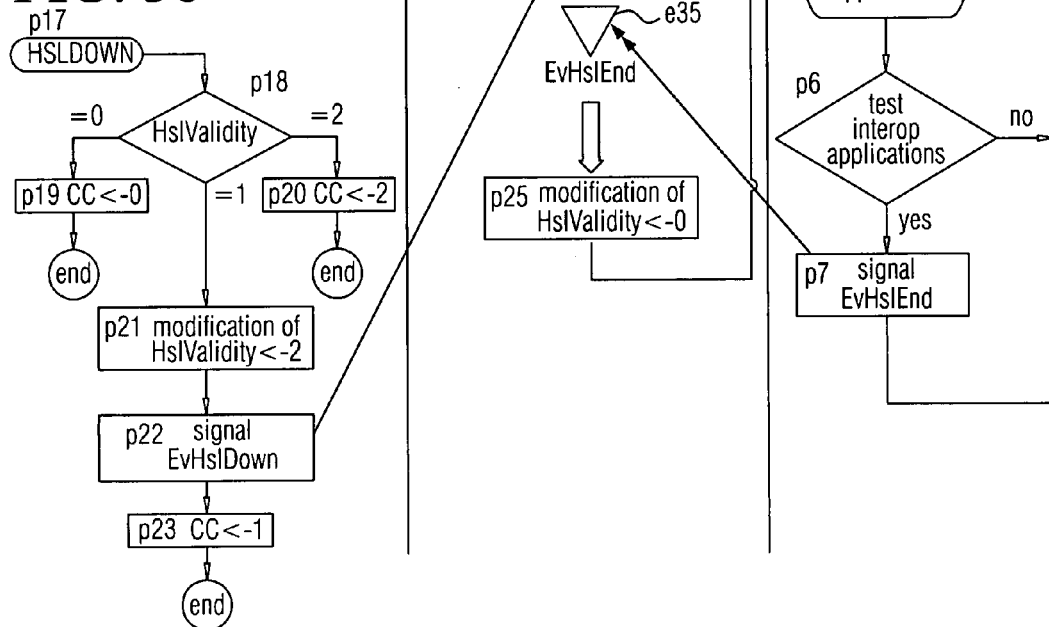
FIG. 3a
FIG. 3b

METHOD FOR EXCHANGING INFORMATION BETWEEN OPERATING SYSTEMS COEXISTING ON THE SAME COMPUTER

FIELD OF THE INVENTION

The present invention concerns a method for exchanging information between processes, tasks, or computer applications executed by different operating systems coexisting on the same computer or the same hardware platform.

BACKGROUND OF THE INVENTION

In many cases, it can be useful to have computer applications from different sources or of different generations, or programmed for different operating systems, coexist on the same computer An operating system may be described as a software entity serving as an intermediary between computer applications and the hardware resources they use. The operating system is accessible from an application through a set of instructions, sometimes called the "interior decor," which work based on a set of rules defining the use of a computer's resources, the functionalities accessible to an operator or to a programming language, and the operating mode of these functionalities.

Such a computer can be composed of a single independent machine, or of several machines or parts of machines cooperating with one another so as to constitute a global hardware platform, for example through a distributed architecture that includes several processors, or several computers working in cooperation and sharing or distributing some of their resources among them.

For example, in conjunction with the evolution or upgrading of the computer hardware used for a computer application, the operating specifications of the available hardware change, particularly with respect to their operating systems. The latter can thus become less compatible, or incompatible, over several different versions, or from one computer model to another.

When some of these applications exist and have been used for a certain length of time, or by a certain number of users or businesses, it may be less costly in terms of both time and money to keep using an older application, particularly one that is well adapted to a given need.

Certain applications may also be available only for a certain operating system, while the needs or the hardware they handle exist on computers that are using another operating system.

It is therefore useful to be able to make an application executed by a certain operating system coexist with other applications executed by one or more other operating systems, and to have them communicate in order to interact with one another when they handle common data or software objects.

For purposes of application standardization, personnel training, or marketing strategy, it is also useful to be able to use the same operating system, qualified as "portable," on machines of various types. Rather than programming a specific version of this operating system for each of these machines, it is known to create a single version capable of being executed by another "basic" operating system that is already available for these various machines. In this case, it is said that this portable operating system runs "on top of" the basic operating system of the machine.

For example, the "GCOS7" operating system by "Bull" (registered trademarks of BULL S. A., a French corporation, hereinafter referred to as "Bull") can be used in the form of a software environment constituting a virtual machine, called"V7000" or "Diane," which itself runs on any hardware machine equipped with the Microsoft"Windows NT" operating system (registered trademarks). Thus, applications developed for a computer using"GCOS7," such as the"DPS7000" by Bull, can be used on any machine in which there is an existing version of "Windows NT."

In order to prevent any conflicts between these various operating systems, which use the available resources in accordance with different rules, each of them must use different parts of these resources, particularly when it comes to memory. The coexistence of several programs that are heterogeneous, i.e., that use different operating systems, will therefore use more resources overall than if they were to share part of them for the data they have in common.

Moreover, the data or software objects that must be communicated between one program and another, or between two of their processes, must be processed by a communication protocol that is compatible with both systems, like a file exchange protocol. This file exchange protocol could be, for example, a protocol like "FTP ("File Transfer Protocol"), as illustrated in FIG. 5. In order to be compatible with several different operating systems, such communication protocols go through a certain number of intermediate steps of increasing complexity. These steps are performed, first, to organize the data to be sent into a common format, and then to decode this format and restore the data to the appropriate form once received. These various steps correspond, for example, to the various "communication layers" as defined by the Operating System Instruction (OSI). In the case of the FTP protocol, these data could, for example, be serialized, then encoded using the TCP/IP protocol, and then transmitted using the FTP protocol, prior to being decoded and stored by the destination process.

Such steps result in a substantial slowdown in the communications between two processes subject to two different operating systems, and a complexity that can be a source of errors or risks when the data are stored in the same machine or hardware platform.

Furthermore, it is also very important for reliability, as well as for application security, that the running of one of the operating systems and its applications does not risk interfering in the running of the other one. The access to and utilization of the resources of the hardware platform by each of them must therefore be organized so as to be as airtight as possible between the two environments.

In order to reduce problems in the maintenance or monitoring of the applications, it is also important for the functionalities that allow the coexistence to require as little modification as possible, both in the applications involved and in the various components of the operating systems that must coexist and communicate.

In order to avoid slowing down one of the processes during a data transfer between two heterogeneous processes, it is also useful for a sending process to be able to make the data available to another process using an asynchronous method, i.e. without waiting for the destination process to be ready or available.

OBJECTS AND CHARACTERISTICS OF THE INVENTION

The object of the present invention is to eliminate the drawbacks of the prior art by offering a method that allows fast communication between client processes running on operating systems that are not directly compatible.

Another object of the present invention is to eliminate the drawbacks of the prior art by offering a method that allows this communication to be asynchronous.

Another object of the present invention is to eliminate the drawbacks of the prior art by offering a method that makes it possible to ensure reliability and security in the running of at least one of the operating systems with respect to the behavior of unknown client processes.

Another object of the present invention is to eliminate the drawbacks of the prior art by offering a method that makes it possible to add a communication mechanism into a heterogeneous architecture without performing any major modifications on the existing set of operating systems.

These objects are achieved through a method for communication between at least two computer processes, called client processes, executed at the same time in a computer system called a hardware platform comprising one or more processors and storage means, at least part of which constitutes an addressable memory area that can be used as a working memory. The client processes are each executed in at least two different operating systems that manage the utilization of the system's resources by their client processes and are not directly compatible with one another. The invention is characterized in that these client processes write or read or modify information called exchange data; in at least one common part, called an exchange memory, of the addressable memory of the hardware platform.

According to one characteristic of the invention, at least one of the client processes writes or reads or modifies exchange data in the exchange memory by accessing one or more locations in this exchange memory through data or addresses that represent, in a constant and unambiguous way, the position of these locations in at least part of the addressable memory of the hardware platform.

According to another characteristic of the invention, at least one of these client processes performs at least one exchange operation, by writing or reading or modifying exchange data in the exchange memory without taking into account the state or the availability of the other client process, or of the operating system of this other client process.

According to a further characteristic of the invention, the management, performed by at least one operating system, of the utilization of the resources by a client process includes the sending of control data, called primitives, from this same operating system to a proprietary software environment that manages the resources of the hardware platform for this operating system, the communication method comprising the execution, handled within this proprietary environment, of at least one process called an exchange engine, which receives the requests for exchange operations from at least one client process and manages the performance of these exchange operations by a process executed in this same proprietary environment.

According to yet another characteristic of the invention, the exchange engine process receives requests for exchange operations from the client processes and handles them using a method comprising a continuous recursive repetition of the following steps:

a wait, by the exchange engine, for an event signaled by a client process, called the requesting process, and representing a request for an exchange operation;

the reception, by the exchange engine from the requesting process, of data (HslOpCell) representing the exchange operation requested;

an exchange, between the exchange engine and at least one process of this proprietary software, of information representing the exchange operation requested; and a wait, by the exchange engine, for an event representing the end of the processing, by the proprietary software, of the exchange operation.

According to a further characteristic of the invention, the exchange data are structured into one or more software objects called exchange objects, stored in the exchange memory. The exchange objects comprise one or more semaphores whose structure includes at least one datum (COUNT) representing the current value of the semophore. The state of these semaphores are such that the semaphores are able to be read or tested by the client processes and are able to be modified through one or more exchange operations.

According to one characteristic of the invention, the modification of an exchange object by a client process, called a requesting process, is done through one or more exchange operations comprising the following steps:

the sending, by the requesting process, of at least one instruction requesting the reservation of an exchange object for the sole use of said requesting process;

the, sending, by the requesting process, of one or more instructions requesting the modification of said exchange object; and the sending, by the requesting process, of at least one instruction requesting that said exchange object again be made available to all of the other client processes.

According to a another characteristic of the invention, the method includes at last one interapplication manager process, handled by the proprietary software, that manages the validity of the requests for exchange operations using a process comprising the following steps:

the detection, by the interapplication manager process of an event indicating that the components that implement the communication method are available;

the sending, by the interapplication manager process to at least one client process capable of using exchange data, of information indicating that the components that implement the communication method are available;

the detection by the interapplication manager process of an event representing the end of availability of the components that implement the communication method; and the sending, by the interapplication manager process to at least one client process capable of using exchange data, of information indicating that the components that implement the communication method must not be used.

According to a further characteristic of the invention, at least one operating system is a software environment compatible with the "GCOS7" operating system by "Bull," the computer system comprising at least one "DIANE" or "V7000" proprietary environment by "Bull," this proprietary environment functioning either as a virtual machine executed by one or more computer systems or directly on a hardware platform adapted to one of these operating systems.

According to yet another characteristic of the invention, the virtual machine is executed by an operating system compatible with "Windows NT" by Microsoft.

According to still another characteristic of the invention, at least one client process is executed by one of the operating systems "GCOS,", "GCOS7," "Windows", "Windows NT", "Unix," or "Linux" (registered trademarks), in one of their versions or variants.

BRIEF DESCRIPTION OF THE DRAWINGS

The invention, along with its objects, characteristics and advantages, will emerge more clearly through the reading of the description given in reference to the attached drawings, in which:

FIGS. 3a and 3b represent a flow chart showing, in parallel, the functioning of the proprietary process of the virtual machine, the exchange engine process, and the application exchange manager, respectively in the case of the activation of the exchange mechanism and the deactivation of the exchange mechanism;

SUMMARY OF THE INVENTION

Figure 1:
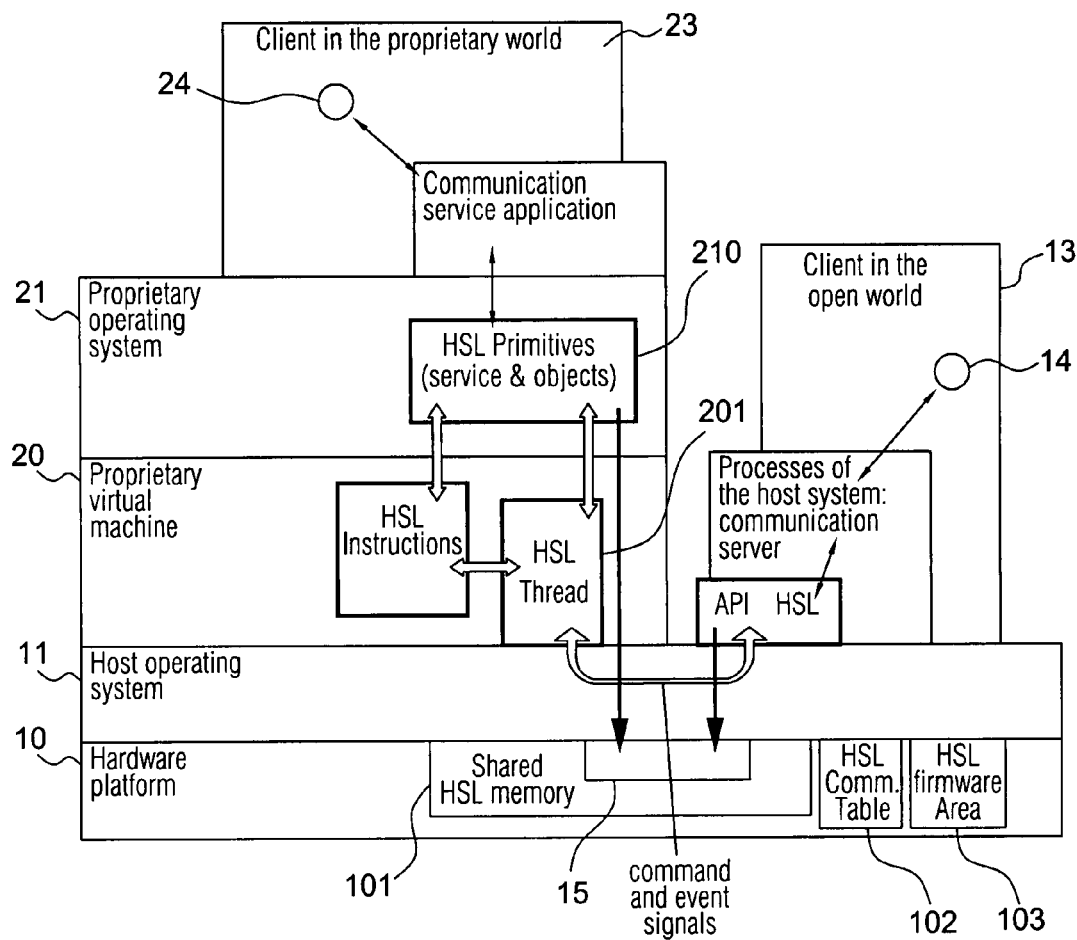
FIG. 1 represents a diagram symbolizing the functioning of the invention in an embodiment wherein one of the client processes is executed by a proprietary operating system, itself executed in a virtual machine that is running in the operating system of another client process.

Before beginning the description of the invention, it may be advantageous to define certain terms and certain concepts applicable to the invention described herein.

In a hardware platform constituted by a computer or by several computer components functioning like a single computer, the term "addressable memory" is used herein to designate a memory space equipped with storage means, when the elements or subsets of this memory space are directly accessible through data that mark their positions inside this memory space. This address data can be used directly or through intermediaries constituting an indirect addressing, but the elements designated by this address maintain a constant position for an extended period of time, so that a program or any other agent or software object can access a part of this memory space without concern for the rest of it. The addresses of a storage area allocated for a given use can be assigned to an addressable physical memory space for just such an extended period of time; this operation can then be called "mapping." The speed of access to a part of such an addressable memory space is thus not very dependent on the quantity of memory it contains, or on the nature of the operations performed in other parts of this addressable memory space.

In the present description, the name "thread" will designate a concatenation of instructions executed continuously one after another, as a function of the conditions defined by these same instructions. This corresponds to the unit element of execution within a program or application, and is generally designated by the name "thread," which suggests a thread of concatenated instructions.

The term "process," is used herein to designate one or more "threads" designed to function by sharing the same memory space.

The term "working memory" is used herein to designate one or more addressable memory spaces, structured and reserved for use by the various processes executed within the framework of the same operating system or the same proprietary environment. This working memory most often comprises what is known as RAM, or Random Access Memory, which can be accessed very quickly, but may also include temporarily or permanently reserved memory spaces in mass storage devices such as hard disks, which are not as fast but are less expensive and nonvolatile.

Within the framework of a software environment comprising proprietary software and/or an operating system, the term "event" herein designates the occurrence of a simple action, activated (or "signaled") by a software agent or a process. Such an action is signaled as an atomic, or indivisible, action, and can be detected by other agents or processes without its being necessary to designate a destination. The nature of such an event can be identified by a name or an identification code, without requiring any other parameters. Whether it repeated once or several times, an event can be detected by a process, within an environment or a given group of processes in which this event is "visible." Each process detecting an event can then decide whether or not it is involved, based on the nature of this event.

When a process or a thread performs one or more operations affecting a given software object, it may need to ensure that no other agent will intervene during these operations. For example, in order to perform an indivisible set of operations. A known type of software mechanism, called a "lock," is used for this purpose. Such a mechanism is generally activated by temporarily modifying a certain datum, which all agents must consult before performing an action on the software object thus protected. In the "Windows NT" environment, a "mutex" (for "mutual exclusive") is a type of lock provided by the operating system.

In the embodiment represented in FIG. 1, the invention is used to place two client processes, each executed by a different operating system (21, 11 respectively) in communication.

These two operating systems are each run on a platform, or machine, and each manages the utilization of resources with respect to the client process that depends on it.

In this embodiment, one of these operating systems is a so-called "proprietary" operating system (21), which literally means "specifically belonging to a manufacturer." Depending on the applications, it may be an operating system specially dedicated to just a few hardware machines, which may be specific or simply not very widely used. It may also be an operating system for which it is necessary to pay for the rights when a piece of software is sold that is compatible with or adapted to this environment. By way of example, in the present application, the invention will be described through this type of embodiment, in which this proprietary system is the "GCOS7" system developed and maintained by "Bull."

In another embodiment (not represented), such an operating system can be used on a hardware platform specially adapted for this purpose, or on a hardware platform that is itself controlled by a software environment specific to the platform, called proprietary software, or "firmware." In such a case, the operating system uses the resources of the platform on behalf of its own or its client processes, by sending commands to the proprietary software in the form of instructions, for example called "primitives," for the "GCOS7" system.

In the exemplary embodiment described herein, the proprietary operating system (21) is used to manage the resources of a platform that is itself software, not hardware. This software platform, called a virtual machine (20) comprises a software package that includes a proprietary piece of software, the "CPU firmware," this software package functioning so as to mimic, for the proprietary operating system (21), the same behavior as a virtual machine, using the same primitives (210) for this purpose. This virtual machine (20) itself runs on a hardware platform (10) via the operating system, called the host operating system (11) of this hardware platform. In the example using "GCOS7," the virtual machine is a software package called "V7000" or "DIANE," running on a hardware platform on "Windows NT."

In this embodiment, the method according to the invention allows communication between a so-called proprietary client process (23) working in the proprietary operating system (21) of the virtual machine (20), and a so-called open client process (13), for example a process of the "Windows NT" type, working directly in the host operating system (11) of the hardware platform (20), for example a platform with a 64-bit architecture equipped with one or more "Itanium" processors by Intel (registered trademarks).

In other embodiments not represented herein, the method according to the invention can be used to allow communication between a client process executed by a proprietary operating system (for example "GCOS7") running directly on a proprietary hardware platform (for example a "DPS7000" computer), and a client process from an open world (for example "Windows NT") executed by an operating system running in a virtual machine or an emulator within the proprietary hardware platform (the "DPS7000").

Likewise, the method according to the invention can be used to allow communication between client processes running on other operating systems, for example of the Unix type.

Likewise, the method according to the invention can be used to allow communication between client processes executed by more than two different operating systems running on the same hardware platform.

Likewise, the method according to the invention can also be used to allow communication between client processes executed by several proprietary operating systems. These operating systems can also run in several different virtual machines coexisting in same hardware platform.

In another embodiment (not represented), the exchange engine is executed in the proprietary software of the hardware platform.

In this embodiment, the operating principle of the invention comprises the use of a method that works like a software mechanism called HSL (for "High Speed Link"), in the example using the "GCOS7" system as the proprietary operating system.

Rather than transmitting data, such as values or states, between the two client processes (13, 23), this HSL mechanism allows one of these client processes to write directly into the working memory, through the memory bus of the platform, the data (24, 14) that must be transmitted to the other client process, or used or modified by it. In the exchange memory (101), this data is then stored as exchange data (15) and is accessible in the same location by one of the heterogeneous client processes (13, 23) or the other.

In the working memory of the hardware platform (10), this HSL mechanism comprises, in particular, the common utilization by both client processes (23, 13) of one or more memory areas, called shared HSL memory or exchange memory (101). The utilization of this exchange memory is common, or shared, in the sense that the same memory areas or addresses are used by several of the client processes that communicate using the HSL mechanism.

This exchange memory (101) contains, in particular, certain data or software objects that must be transmitted from one client process (13, 23) to another, or must be able to be used by several of these client processes. Thus, when a sending client process wants to store or modify a software object that must be read or tested by another destination client process, i.e., an exchange object that is part of the exchange data (15), it will store this exchange object in the exchange memory (101). It is then this same data that the destination client process will read in the same location of this common exchange memory where sender has stored them.

The fact that each client process writes or reads this exchange object directly in an addressable part of the working memory allows it to perform this operation at a fast speed similar to that of its own operations within its own operating system; i.e., at a speed that approximates the optimum performance of the computer system used.

Due to the fact that the exchange objects are stored in a common part of the memory of the hardware platform, each client process can modify or read each of these exchange objects independently from the actions or the states of the other client processes that have access to them, i.e., asynchronously. The operation of each client process can thus be programmed quite freely with respect to elements outside this process. The asynchronous aspect of the data transmissions also allows for a fast operating speed of each of its client processes, since it does not need to wait for or verify the availability of its correspondent during an exchange object transmission.

This HSL mechanism also comprises the use of a so-called exchange engine process (201), for example a thread called "thread CpuHsl."

This exchange engine (201) comprises a process that is executed in a loop throughout the period of activity or validity of the HSL mechanism. This exchange engine plays the particular role of centralizing the requests for access to the exchange memory (101), and thus of ensuring the coherency and unity of the processing.

This unity in processing makes it possible, in particular, to ensure that each action by a client process in the exchange memory is done in a way that is complete and indivisible, or atomic, from the point of view of the other client process that can access it.

This HSL mechanism thus makes it possible to ensure a certain reliability and security in the utilization of the memory, by constituting a framed and controlled access path through which must pass all the actions of each client process wishing to access a part of the working memory involving other processes or programs. This reliability and security make it possible, in particular, to protect sensitive data or programs in themselves, or in connection with the operation of the system, against risky actions that can come from a client process contained in a program that is malicious or whose operation is not debugged or does not properly comply with the rules corresponding to one of the elements of the system.

In order for this HSL mechanism to function correctly, a certain number of elements must be running, validated and available. The activation and validation of this mechanism can be controlled through the operating system or through a process, using an activation command.

When the deactivation of this HSL mechanism is ordered, the mechanism goes through a shutdown phase during which the exchange operations already begun are finished, and no new exchange operation is accepted.

During operation, each client process can act on data stored in the exchange memory (101), using various operations called exchange operations. These operations perform a certain number of specific and codified actions, and can be implemented by means of parameters that determine their behavior.

These exchange operations are implemented in each of the various operating systems (11, 21) so as to be accessible to the programmer of a client process through the utilization in its program code of an instruction specific to each of these exchange operations. These instructions are given to the programmer in the form of an instruction library adapted to the operating system in which he is working.

Figure 2:
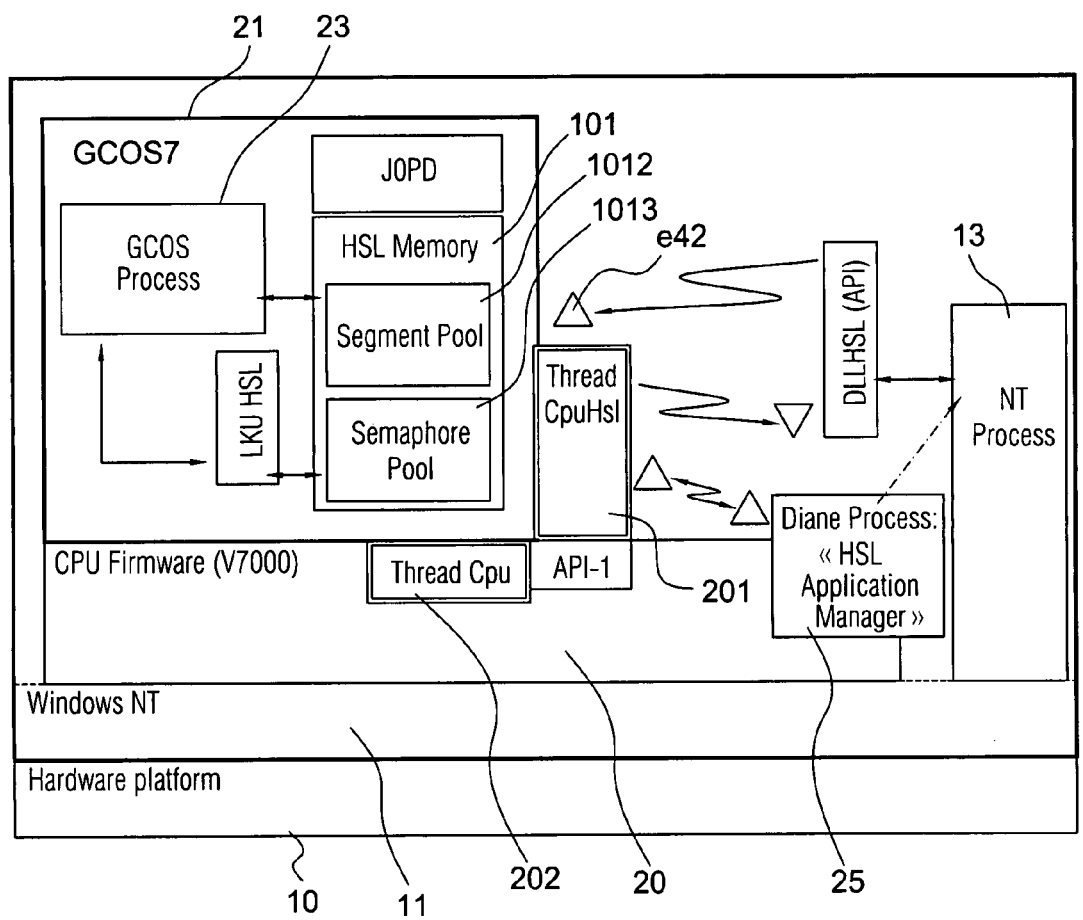
FIG. 2 represents a diagram of the organization of the software layers of a platform implementing the invention, in an embodiment wherein the virtual machine is a Diane type using an operating system of the "GCOS7" type, and runs on a hardware platform running "Windows NT"

In this embodiment, as illustrated in FIG. 2, for a proprietary client process (23) in "GCOS7," these operations are implemented in a primitives library (210) called LKU HSL. For a client process in "Windows NT," these instructions are implemented as APIs ("Application Program Interface") accessible in a DLL-type library (110) called DLL HSL.

It is thus possible for the programmer of a program running on one of the operating systems in question or another to adapt his program so that it is capable of using the HSL mechanism. Because of the codification of the exchange operations and their availability in a form directly accessible in the programming environment, such an adaptation is possible without changing the programming language, and with a limited quantity of modifications or rewriting.

The management of the entire HSL mechanism includes the utilization of an interapplication manger process (25), called HAM for "HSL Application Manager" in the example illustrated here.

This interapplication manager (25) plays the particular role of coordinating the utilization of the HSL mechanism by the various applications or client processes in question. This involves, in particular, informing these various applications of the activation of the HSL mechanism, or when the latter will be shut down, in order to allow them to take steps to react in an appropriate fashion.

In the embodiment described herein, the exchange memory is structured into a suite of software objects, or exchange objects, or HSL objects, having one or more specific structures. In the example described herein, the exchange objects have structures based on software objects as defined in the proprietary operating system "GCOS7" (21).

The "GCOS7" operating system uses a working memory distributed into portions called segments. The various segments of the working memory are indexed in a software structure comprising a certain number of numbered tables, these tables themselves comprising a certain number of entries. During the allocation of a memory area to various segments of the working memory, known as the "mapping" of these segments, each of these entries can contain the address of a memory area that is allocated to one of these segments.

In the working memory, a segment can thus be designated unambiguously through a datum called a segment descriptor called SD, which includes the following elements:

STN (Segment Table Number): the number of the table containing the address of the segment in question;

STE (Segment Table Entry): the number of an entry in the table defined by STN, this entry containing the address of the segment in question in the memory of the hardware platform.

In the "GCOS7" operating system, there are a certain number of defined structured software objects called semaphores, which are defined in the "GCOS7" system as elements of its "interior decor." These semaphores can be tested by the processes running on "GCOS7" and can be modified by them using specific operations, which are also defined in this interior decor.

These semaphores include above all a datum called "SCT" serving as a counter, plus a datum called "Max-Count" corresponding to its maximum authorized value in a given utilization.

A semaphore can be a simple type, called "SN," or a type with message, called "SM." A message semaphore is a semaphore with which is associated a datum that constitutes a pointer indicating a memory area or in which can be stored a message comprising other data (at most four 4-byte words for "GCOS7"). This message can, for example, contain a value to be transmitted, or the address in memory of data or software objects to be transmitted.

A semaphore can be designated unambiguously through the segment descriptor (SD), which designates the memory segment that contains the semaphore, followed by a datum called "SRA" (Segment Relative Address), which indicates the relative position of the start of the semaphore in the designated segment.

Some of the basic operations that can be used to act on a semaphore include, in particular, the reservation and release, as well as the incrementation and decrementation of a semaphore, through instructions specific to the "GCOS7" system. These instructions are coded by an operation code and include the utilization of a memory register, called a general register, for transmitting a parameter designating the semaphore to be used.

The reservation and the release of a semaphore are implemented by instructions, respectively called "GETSEM" and "FREESEM." The reservation of a semaphore corresponds to a request for exclusive allocation of a semaphore to the requesting process. This exclusivity makes it possible, in particular, to guarantee that this semaphore will not be modified by another process during the time in which the requester is performing its operations on this semaphore. The release of a semaphore corresponds to making the semaphore available again to the operating system and the other process wishing to access it.

The incrementation and the decrementation of a semaphore are implemented by instructions, respectively called "V-OP" and "P-OP."

The semaphores can be used for multiple tasks within one or more client processes in "GCOS7," and this type of software object also exists in other operating systems not mentioned here. Semaphores can be used, for example, to keep track of a number of operations performed on a software object by one or more processes that do not directly know each other.

They can be used to synchronize several processes, for example by keeping one of them waiting until the semaphore has reached a certain value. One then need only have the semaphore be incremented by the other process when it is ready for a synchronization. They can be used to manage a queue of tasks or objects to be processed.

In the embodiment described herein, the method according to the invention includes the common utilization of an exchange memory (101). This exchange memory is used by heterogeneous client processes (13, 23), through predetermined operations affecting software objects, or exchange objects, belonging to this exchange memory.

In the example described herein, which uses a "GCOS7" system running on a "Windows NT" platform, the exchange memory comprises exchange objects structured based on formats specific to the "GCOS7" system. These exchange objects are, in particular, memory segments in the "GCOS7" format, and semaphores of the "GCOS7" type, with or without messages.

The HSL exchange memory is a part of the working memory of the "GCOS7" system, for example in the RAM of the hardware platform, allocated to the HSL mechanism. This allocation is done, for example, during the startup of the "GCOS7" system by a process called JOPD, which is the first process to be executed in this case.

This exchange memory is reserved by this JOPD process and organized into several groups of exchange objects, or "pools," which contain exchange objects of different types available to the processes using the HSL mechanism.

Part of the exchange memory is composed of HSL objects of the semaphore type, with or without messages, distributed into one or more groups called semaphore pools (1011).

Another part of the exchange memory is composed of HSL objects that essentially comprise the memory space divided into segments, distributed into groups called segment pools (1012).

In order to manipulate these "GCOS7" exchange objects, the method according to the invention includes the implementation of additional commands and instructions, added to the two operating systems in question. It can also include existing commands, whose operating mode is adapted by modifying certain components of the proprietary software (firmware) or the operating system to which they belong.

These new or modified commands comprise commands for manipulating exchange objects in the exchange memory (101), these commands working in a way similar to the existing commands in the "GCOS7" system to manipulate objects of similar types, particularly semaphores.

These new or modified commands also comprise commands for managing the HSL mechanism itself.

The commands for managing the HSL mechanism are implemented in the proprietary software of the virtual machine, "V7000" or "DIANE." These commands are launched by a human or software operator via an internal instruction set that is part of the "interior décor" of the virtual machine.

This internal management of the HSL mechanism uses, in particular, a memory area of the "BCOS7" system specific to the HSL mechanism, called "HSLControlArea.: This memory area HSLControlArea (not represented in the figures) contains, in particular, information concerning the objects of the proprietary, or native, world ("GCOS7") that are used by the HSL mechanism.

The following instructions make it possible, respectively, to start up and shut down the HSL mechanism:
HSLUP
HSLDOWN The following instructions make it possible to manipulate semaphore-type exchange objects from a client process of the "GCOS7" world:

HSLGETSEM: allows the reservation of an HSL semaphore, in the exchange memory (101) (or shared HSL memory), by a client process, for the purpose of upcoming exchange operations;

HSLFREESEM: allows the release of an HSL semaphore, in the exchange memory (101) (or shared HSL memory), by a client process, after exchange operations;

V-OP: is the unchanged operation of the "GCOS7" system that can also be used to increment a semaphore reserved in the HSL memory;

P-OP: is the unchanged operation of the "GCOS7" system that can also be used to decrement a semaphore reserved in the HSL memory.

The same operations can be performed on an HSL semaphore from a client process of the "Windows NT" world, through software tools of the API type added to the "Windows NT" environment. In their programming, these APIs use instructions added to the proprietary software of the virtual machine. These instructions are programmed in the virtual machine to behave in relation to the exchange objects just like the HSL instructions of the "GCOS7" system. These instructions therefore make it possible to manipulate semaphore-type exchange objects from a client process of the "Windows NT" world, and include the following instructions:

Sim-HSLGETSEM: an instruction accessible by the APIs that copies or simulates the operation of the HSLGETSEM instruction;

Sim-HSLFREEMEM: an instruction accessible by the APIs that copies or simulates the operation of the HSLFREESEM instruction;

SimHSLV-OP: an instruction accessible by the APIs that copies or simulates the operation of the V-OP instruction;

SimHSLP-OP: an instruction accessible by the APIs that copies or simulates the operation of the P-OP instruction.

In the "GCOS7" operating system, certain primitives are modified in order to allow the operation of the HSL mechanism, and certain primitives are added. These modifications include, in particular, the following procedures or macros:

H_VMM_HSL_INIT: a new procedure added into the software nucleus ("NUCLEUS") of the operating system. This procedure performs an initialization of the elements of the HSL mechanism, for example by declaring or opening the HSL communication table (102) and the proprietary control area (103). It also makes it possible to lock the exchange operations, reserving the first of the semaphores (SN) in the exchange memory (101) for this purpose. It also prepares, in a software structure called "HSLUP_STRUCT," the parameters that will be used by the instruction HSLUP to activate the HSL mechanism;

H_NIPS_EPRD: is a modification of the "NIPS" procedure of "GCOS7," which makes it possible to call the procedure H-VMM_HSL_INIT;

$H_DCSBE and $H_TSTDECOR: are declaratives of the "GCOS7" system that are modified by the addition of a bit specifically used by the HSL mechanism, in a capability byte (CAPB13). This modification of the capability byte makes it possible to record the fact that the system capable of using the HSL mechanism;

H_SSMGET_HSL: a new primitive of the "GCOS7" system, used by the instruction HSLGETSEM to reserve a semaphore in the exchange memory;

H_SSMFREE_HSL: a new primitive of the "GCOS7" system, used by the instruction HSLFREESEM to release a semaphore previously reserved in the exchange memory;

H_TASKM_IGHSL and H_TASKM_IFHSL: new entry points, or call syntaxes, or the procedures H_TASKM_IGSM and H_TASKM_IFSM of the "GCOS7" system. These entry points are used to reserve and release semaphores in the case where these semaphores are exchange data used by the HSL mechanism;

H_VMM_JTAB: a modification of this procedure, included in the "VMM" software module of the "GCOS7" system, for adding the declaration of software objects ("H_HSL_TABLE") related to the HSL communication table;

H_VMM_IISDCR: a modification of this procedure, included in the "VMM" software module of the "GCOS7" system, for deleting the "$H_ISDCR" control, which becomes unnecessary and would risk causing harmful interactions in the management of the memory segments used by the HSL mechanism;

$H_VMM_SICID: a modification of this primitive, included in the "VMM" module of the "GCOS7" system, in order to add the identification ("SICID") of the new procedure H_VMM_HSL_INIT.

The APIs used by the client processes of the "Windows NT" world are grouped into one or more dynamic link libraries, or DLLs. The APIs contained in these libraries are directly accessible by these processes, as soon as the DLL files containing these libraries are present in the directories containing the "Windows NT" system.

This accessibility by simply copying a new file, or a few new files, is one of the elements that gives the system great modularity and easy adaptability during the implementation of the method according to the invention.

These libraries comprise, in particular, APIs for managing the communication area, which includes the HSL communication table (102) and the control area (103), or their counterparts in the "Windows NT" world:

The function CreateHSLInterfaceArea creates the communication space required for the HSL mechanism (i.e., among other things, the communication table, the control area, the pointer table and the associated pointers) as well as the common events ("event") and locks ("mutex" for "mutual exclusive");

The function OpenHSLInterfaceArea opens this communication space required by the HSL mechanism;

The function CloseHSLInterfaceArea closes this communication space required by the HSL mechanism;

The function GetHSLInterfaceAreaAddress returns the pointer to the communication space required by the HSL mechanism, and thus provides the address that allows access to this communication space;

The functions InComTable and OutComTable handle the locking of the control table.

These libraries also comprise APIs for the manipulation of HSL semaphores of the "GCOS7" world by processes of the "Windows NT" world:

The function GetSemaphoreHSL makes it possible to obtain an HSL semaphore of the messageless type (HSL-SEM_TYPE_SN) or the type with message (HSL_SEM_TYPE_SM). The semaphore request emanates from an NT process; The CPU thread will have to execute an instruction "Sim-HSLGETSEM," which simulates on the NT side the native "GCOS7" instruction GETSEM;

The function FreeSemaphoreHSL makes it possible to release an HSL semaphore. The request to release the semaphore emanates from an NT process;. The CPU thread will have to execute a "Sim-HSLFRESEM.";

The function POPonSemaphoreSN makes it possible to perform an operation of the P-OP type on a messageless HSL semaphore;

This API sends a P-OP request to the thread CpuHsl and waits for the event sent as a parameter to be woken up;

The function POPonSemaphoreSM makes it possible to perform an operation of the P-OP type on an HSL semaphore with message. This API sends a P-OP request to the thread CpuHsl and waits for the event sent as a parameter to be woken up;

The function VOpOnSemaphoreSN makes it possible, on the NT side, to perform a VOP on a messageless HSL semaphore. This API sends a request for a V-OP on an HSL semaphore, and waits for the event sent as a parameter to be woken up when the operation is finished;

The function VOpOnSemaphoreSM makes it possible, on the NT side, to post a message to an HSL semaphore with message. This API sends a request for a V-OP on an HSL semaphore, and waits for the event sent as a parameter to be woken up when the operation is finished.

These libraries also comprise APIs for managing the exchange memory (101), or HSL memory, shared between the two worlds (allocating and releasing memory segments reserved for this HSL mechanism):

the function MapReadHSLSegment gives the pointer to a portion of "V7000" memory to the NT applications using HSL (a portion which corresponds to a small "GCOS" segment, i.e. 64 KB).This API is called by the NT processes for the functions that manage the properties of the HSL mechanism related to the allocation and release of memory space;

the function MapWriteHSLSegment gives the pointer to a portion of "V7000" memory to the NT applications using HSL (a portion which corresponds to a small "GCOS" segment, i.e. 64 KB).This API is called by the NT processes for the functions that manage the properties of the HSL mechanism related to the allocation and release of memory space;

the function UnmapHSLSegment removes the view of a portion of "V7000" memory on the NT side (a portion that corresponds to a "GCOS7" segment).

These libraries also comprise APIs for accessing the control area of the HSL mechanism (opening and closing access to the HSL communication table, a subset of which is called "HslTable"):

the function mapHSLTable gives the pointer to each of the 2 segments of the HSL Table kept in the HSLFirmwareArea. This API is called by HSL upon initialization on the NT side. It provides the NT pointers to the 2 segments of type 0 containing the HSL software control table. "HslTable."

the function UnmapHSLTable removes the view of the 2 segments of the HSL_Table on the NT side. This API is called by HSL at the end of HSL (after HSLDOWN). It destroys the visibility of the segments of HSL software control table (HslTable).

Figure 4:
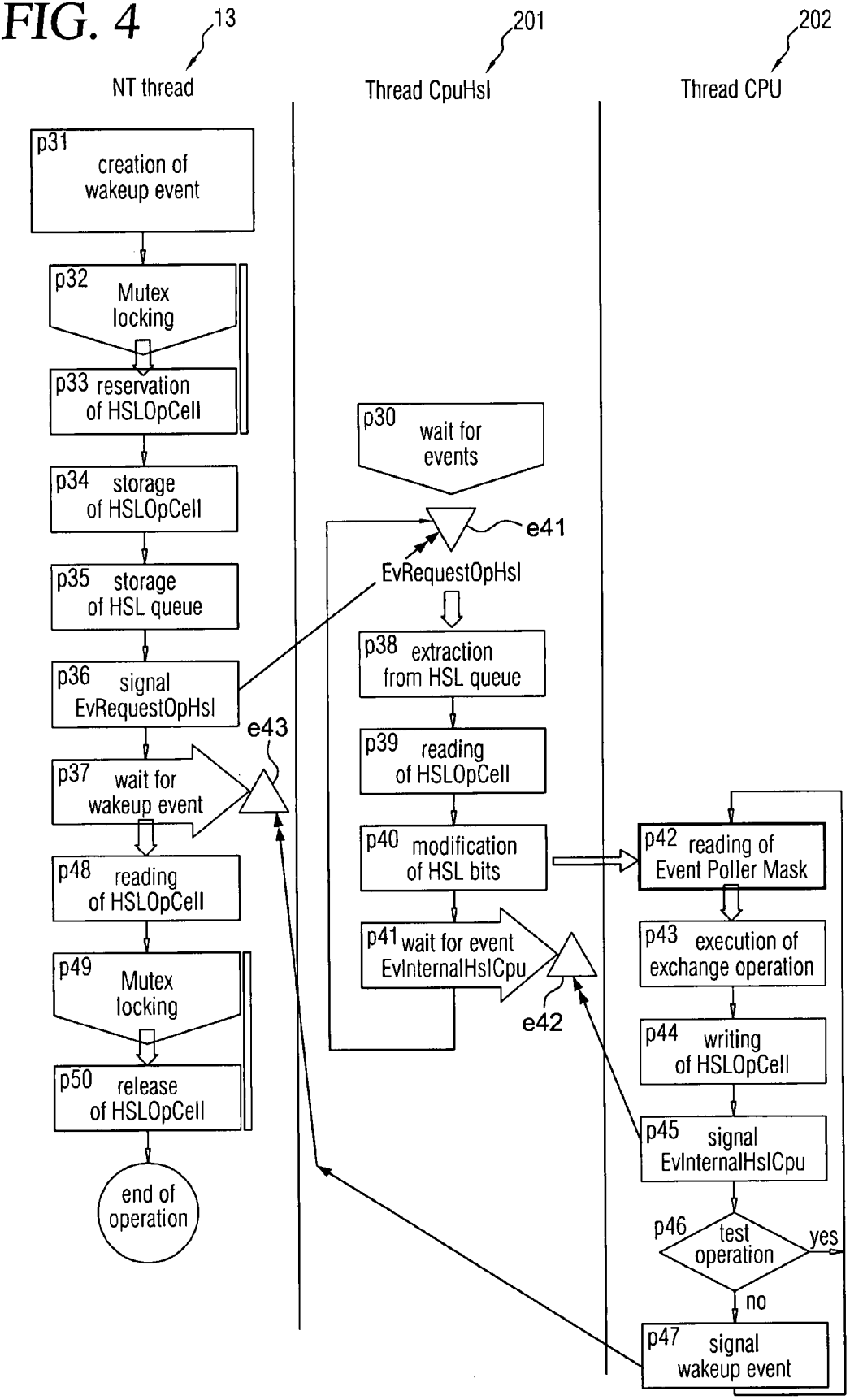
FIG. 4 represents a flow chart showing, in parallel, the functioning of a client process of the "Windows NT" type, the exchange engine process, and the proprietary process of the virtual machine, in the case of a request for an exchange operation by the "Windows NT" client process.
Figure 5:
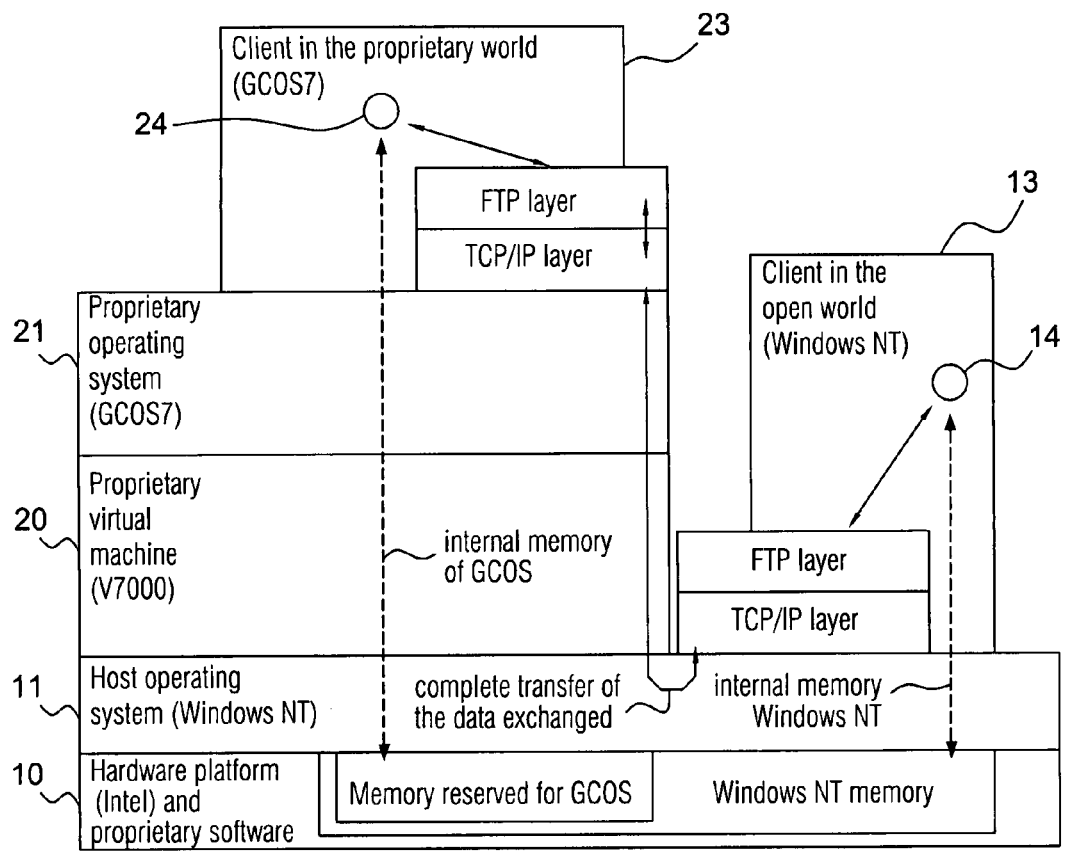
FIG. 5 represents a symbolic functional diagram of a system according to the prior art, using communication by FTP and TCP/IP protocol.

In this embodiment, as represented in FIG. 4, the exchange engine (201) is actuated by a thread ("thread cpuhsl") executed in the virtual machine (20) so as to be able to detect events signaled either by a client process (23) of the proprietary world or by a client process (13) of the open world (11), i.e. in the example, the "Windows NT" environment.

The execution of this thread is controlled and parameterized by internal primitives or instructions of the proprietary operating system (21), for example public macros, which interact with the proprietary software environment that supports the virtual machine (20). In order to implement the HSL mechanism, certain primitives of the "GCOS7" system are modified and certain additional primitives are added and implemented as described above.

Thus, as illustrated in FIG. 4, the interaction of the process functioning as the exchange engine (201) with the client processes (13, 23) and with the proprietary process, also called "thread cpu," takes place, in particular, through the signaling of events by a sender in the software environment of the destination;

the storage by the sender, in a location known to the destination, of data or parameters to be transferred.

This parameter storage takes place, in particular, in memory areas called "HSLCommunicationTable" (102) and "HSLFirmwareArea" (103), whose addresses are known to the processes that need to access them.

The communication between the client processes (13, 23) and the exchange engine (201) uses a memory area called the HSL communication table (102) (or "HSLCommunicationTable"). This HSL communication table, located in the working memory of the hardware platform (10), comprises a table composed of a plurality of memory locations, called operation cells and marked "HSLOpCell," with identical structures and marked in the table (102) by an index or entry number.

Once the HSL mechanism is activated, when a client process, for example an NT process (13), i.e. running on "Windows NT," wants to request an exchange operation on a software object in the exchange memory (101), this client process begins by internally defining the nature and the parameters of this exchange operation.

It then creates (step p31) and prepares a wake-up event (e43) that is both unique and new, represented for example by an incremental code, obtains (p33) an available operation cell HSLOpCell in the HSL communication table (102), and stores in it (p34) the references of this new wake-up event (e43), as well as the data representing the exchange operation requested and its parameters. In order to avoid incomplete operations or other interactions, this storage in HSLOpCell takes place after locking (p32) the HSL communication table (102) using a "Mutex" lock in the "Windows NT" operating system.

It also stores (p35) in a queue of the FIFO ("first in first out") type, called an HSL queue, the references of each operation cell HSLOpCell, and signals (p36), in a way that is visible to the exchange engine (201), a known event EvRequestOpHsl (e41) indicating the presence of a new exchange operation request in this queue.

The client process (13) then goes to sleep (p37), waiting to detect the signaling of the unique wake-up event (e43) it has created and stored in the operation cell HSLOpCell.

Between two operations, when the HSL mechanism is activated, the exchange engine "thread cpuhsl" (201) is asleep or in a loop, waiting (p30) for a new request for an operation, for example an exchange or deactivation operation.

When it detects an event EvRequestOpHsl (e41) signaling a new exchange operation request, the exchange engine extracts (p38) from the HSL queue the references of the operation cell HSLOpCell containing the data of this request.

It then reads the references of this operation cell and stores tem in a memory area called the HSL proprietary control area (103) (or "HSLfirmwarearea").

From these references, the exchange engine reads (p39) in the HSL communication table (102) the content of the operating cell, and interprets it in order to determine the nature and the parameters of the exchange operation requested.

Through its communication with the proprietary process (thread cpu) in the virtual machine (firmware cpu in the "V7000" machine), it initializes the necessary conditions for the execution of this exchange operation. In the example, this initialization is done by modifying (p40) one or more predetermined bits, called "HSL bits," in a register called an "event poller mask," the modification of which adjusts the functioning of the detection of the events by the proprietary process "thread cpu" (202) or process cpu.

The exchange engine (201) then goes to sleep (p41), waiting for a known event called "EvInternalHslCpu" (e42) to tell it that the exchange operation has been executed by the proprietary process (202).

When a loop occurs in after the modification (p40) of the register (event poller mask"), the proprietary process "thread cpu" (202) retrieves the content of this register, which leads it to execute (p43) the corresponding exchange operation.

The execution (p43) of this operation specifically includes the reading, in the proprietary area (HSLfirmwarearea) of the references of the operation cell. In this operating cell, the proprietary process can then read the nature and the parameters of the exchange operation requested, as well as the references of the wake-up event corresponding to this exchange operation.

Based on the result of this exchange operation, the proprietary process writes (p44) into a part of the operation cell HSLOpCell a code called a complementary code, or condition code, marked "CC," which represents this result. It then signals (p45) an event EvInternalHslCpu (e42), thus waking up the exchange engine (201).

If conditions allow, for example if the exchange operation is complete or is not an operation considered (p46) to be inhibiting, the proprietary process "thread cpu" then signals (p47) the wake-up event (e43) awaited by the client process (13) that originated the request.

Once woken up, the client process (thread NT) can the read, in the operation cell, the complementary code CC representing the result of the exchange operation it had requested. It then stores (p48) the result of this operation in its internal operating parameters in order to integrate it into the rest of its operation.

Once the exchange operation is finished, the client process can then release (p50) the operation cell of the HSL communication table (102) that was used for this exchange operation. In order to avoid incomplete operations or other interactions, this release of the operation cell HSLOpCell takes place after locking (p49) the HSL communication table (102) using a "Mutex" lock in the "Windows NT" operating system.

It is understood that the presence of the exchange engine allows the client processes to request exchange operations without having to work within the proprietary software (20), and in particular, without accessing the register "event poller mask." It is therefore possible to offer these client processes exchange operations that allow them to directly access the working memory of the virtual machine, for example "V7000," without allowing them to act on elements that are both vital to the operation of the system and not very well protected against programming errors.

This exchange engine therefore constitutes a buffer process, managed by the virtual machine and allowing limited access from the outside, thereby providing good security and reliability while allowing fast access to the common data in the exchange memory.

The interapplication manager (25) specifically includes a thread that runs in a loop, illustrated in FIGS. 3a and 3b.

During its normal operation, this thread, or thread HAM, is waiting (p1) for one or more events corresponding, in particular, to a request to activate or shutdown the HSL mechanism in the system. When it detects one of these events, the thread HAM exchanges the corresponding information with various applications, called interop applications, which use processes that run on several operating systems and use the HSL mechanism.

At the end of these information exchanges with the interop applications, the thread HAM can signal one or more events indicating the completion of these exchanges and their result.

The elements of the HSL mechanism are initialized or prepared so as to be made available to the client processes (13, 23) through the use of a command called "HSLUP."

Upon reception (step p9) of this instruction HSLUP, a thread of the proprietary software of the virtual machine, called thread CPU (202), begins by verifying the operational state of this HSL mechanism. To do this, the thread CPU tests (p10) in the HSL proprietary control area, or HSLFirmwareArea (103), the value of a datum called HslValidity, and from that deduces the current state of the HSL mechanism. If this datum has a value different from 0, the thread CPU terminates the instruction HSLUP by returning (p11) a complementary code marked "CC," with a value of 3, which indicates that the HSL mechanism is not inactive.

If the HSL mechanism is inactive, the thread CPU (202) executes (p12) the operations for activating this HSL mechanism and records this activation by storing (p13) the value 1 in the field HslValidity of the HSLFirmwareArea (103). In order to ensure the complete execution of this activation without risking any interaction with another instruction that could reach it during processing, the thread CPU performs this modification (13) of HslValidity under the protection of a software lock placed on the HSLFirmwareArea (103).

Once this activation has been performed (p12) and recorded (p13), the thread CPU signals (p14) an event EvHslUp (e33) indicating this activation, and terminates the instruction HSLUP by sending (p15) a complementary code (CC) with a value of 0, corresponding to a correct execution of the instruction.

When the exchange engine (201), through the tread CpuHsl, detects the above event EvHslUp (e33), it signals (p16), or sends, an event "EvHAMUp" (e31) indicating that the HSL mechanism is accessible to the interapplication manager (25), or HAM, then goes back to waiting (p0) for an event that concerns it.

When the HAM (25) detects (p2) this event EvHAMUp (e31), it starts (p3) or restarts the various interop applications that were waiting for the mechanism HSL, or indicates to them that they can now use it.

Upon reception (p17) of an instruction "HSLDOWN" telling it to close the HSL mechanism, the thread CPU (202) begins by verifying the operational state of this HSL mechanism. To do this, the thread CPU checks (p18) in the HSL proprietary control area, or HSLFirmwareArea (103), the value of the datum HslValidity, and from that deduces the current state of the HSL mechanism.

If this datum HslValidity has a value of 0, the thread CPU (202) terminates the instruction HSLDOWN by returning (p19) a complementary code (CC) with a value of 0, which indicates that the HSL mechanism is already inactive.

If this datum HslValidity has a value of 2, the thread CPU terminates the instruction HSLDOWN by returning (p20) a complementary code (CC) with a value of 2, which indicates that the HSL mechanism is already being shut down.

If this datum HslValidity has a value of 1, the thread CPU records this shutdown request by storing (p21) the value 2 in the field HslValidity of the HSLFirmwareArea (103). In order to ensure that this recording is executed completely, without risking any interaction with another instruction that could reach it during processing, the thread CPU performs this modification of HslValidity under the protection of a software lock inserted into the HSLFirmwareArea (103).

Once this shutdown request has been recorded, the thread CPU signals (p22) an event EvHslDown (e34) indicating this shutdown request, and terminates the instruction HSLDOWN by sending (p23) a complementary code (CC) with a value of 1, indicating that the HSL mechanism was active and that the shutdown request has been recorded.

When the exchange engine (201) or thread CpuHsl, detects the above event EvHslDown (e34), it signals (p24), or sends, an event EvHAMDown (e32), indicating to the interapplication manager (25), or HAM, that the HSL mechanism will be shut down.

When the HAM (25) detects (p3) this event EvHAMDown (e34), it requests (p5) all the interop applications using the HSM mechanism to terminate their HSL exchange operations, and waits (p6) until they have all confirmed this termination.

When all the interop applications have stopped using the HSL mechanism, the HAM signals (p7) an event EvHslEnd (e35), which indicates to the exchange engine (201) that the HSL mechanism is no longer being used.

When it detects this event EvHslEnd (e35), the exchange engine (201) records the effective shutdown of the HSL mechanism by storing (p25) a value of 0 for the field HslValidity of the HSLFirmwareArea (103), then goes back (p0) to waiting for an event that concerns it.

It is understood that the presence of this interapplication manager (25), or HSL Application Manager, makes it possible to manage the utilization of the HSL mechanism by all of the applications in question by means of a simple set of events, giving the process modularity with respect to the configuration of the system. These events are sufficiently specific and external to the HSL mechanism, and to the software of the operating system (21, 11) and of the virtual (20) or hardware (10) machine, for the utilization of this mechanism in the various applications to be simple to adapt to them.

Due to the fact that the interop applications do not act directly on the activators of the HSL mechanism, in particular the exchange engine (201), the HSL communication table (102) and the HSL proprietary control area (103), the applications outside the operating systems (11, 21) have very few interactions with the internal elements of these operating systems.

In this respect, the method of the invention makes it possible to minimize the risks of interference or diversion in the running of these operating systems, and thus of the machine, when client applications (13, 23) access software objects stored directly in the working memory.

In the embodiment described herein, for the example of a proprietary operating system like "GCOS7," the memory areas used to coordinate the operation of the HSL mechanism can have, in particular, the structures described below.

The communication table between the "Windows NT" APIs and the "Thread CpuHsl" has a table structure of 256 entries or records that are identical in structure, called operation cells and marked "HslOpCell."

Each entry is 32-bit encoded and includes the following data fields:

---
Number of the entry
Status (FREE/BUSY/READ/DELIVERED/WAITING/DONE)
Operation simulated (Get, Free, Pop or Vop)
Type (SN or SM)
SID: STN-STE-SRA (identification of the semaphore)
ProcessID
Handle of the event (64 bits)
(0 in the second word if the architecture is Intel 32-bit)
Report
Maxcount
Count
MessageFirstWord
MessageSecondWord
MessageThirdWord
MessageFourthWord
Filler
---

Number of the entry: the index or position of the entry; it is the number that is transmitted to the "thread CpuHsl" (a value between 1 and 256 inclusive) in order to let it know where the parameters of the exchange operation requested are located;

Operation=the nature of the request, which corresponds to a simulated exchange operation, codified as follows: GETSEM :01, FRESEM :04, POP :02 or VOP :03;

Type: the type of the semaphore involved, codified as follows: messageless semaphore (SN): type=1, or message semaphore (SM): type=2;

STN-STE-SRA: an address based on the segment identification, which identifies the semaphore (the address of the descriptor of a "GCOS" semaphore). This field in the table (HSLCommunicationTable) is an entry parameter used in requests for operations of the P-OP, V-OP or FRESEM type;

"Handle": a code identifying, in "Windows NT," the event upon which the calling or requesting client process wants to be woken up at the end of operation. If a P-OP type operation is inhibiting, this is the event for which the "Windows NT" client process will keep waiting.

Maxcount and Count: these fields, which are significant in a GETSEM type operation, are used to initialize the semaphore;

Status: state of the entry. This is a field reserved for the internal management of the mechanism, and reflects the progress of an exchange operation request.

MessageFirstWord to MessageFourthWord: 4 words of memory used to transmit the data constituting the message associated with the semaphore in question, in the case of a message semaphore (SM).

The area "HSLCommunicationTable" is a structure included in the memory area allocated to the HSL mechanism, and whose address is obtained in a "Windows NT" client process, using the API: "GetHSLInterfaceAreaAddress" of the DLLHSLInterfaces.

The mechanism for managing the HSL communication table (or "HSLCommunicationTable") uses an intermediate index table, which ensures the reliability of the handling in "FIFO" (First In First Out) mode of all the entries or cells HslOpCell containing an exchange operation request.

The proprietary control area, used by the thread Cpu HSL, or "HSLFirmwareArea," has a structure comprising the following data fields:

---
Validity
Number of semaphore pool segments
"GCOS" absolute address of the 1$^{st}$ semaphore pool segment
"GCOS" absolute address of the 2$^{nd}$ semaphore pool segment
"GCOS" absolute address of the 3$^{rd}$ semaphore pool segment
"GCOS" absolute address of the 4$^{th}$ semaphore pool segment
STN-STE.0 of the 1$^{st}$ semaphore pool segment
STN-STE.0 of the 2$^{nd}$ semaphore pool segment
STN-STE.0 of the 3$^{rd}$ semaphore pool segment or 0
STN-STE.0 of the 4$^{th}$ semaphore pool segment or 0
Number of semaphores SN per pool segment
SRA of the 1$^{st}$ SD of semaphore SN
Number of semaphores SM per pool segment
SRA of the 1$^{st}$ SD of semaphore SM
Segment No. for next allocation
Filler
---

The area "HSLFirmwareArea" comprises 15 memory words corresponding to the STN-STEs and to the "GCOS" absolute address of each segment of the semaphore pool allocated (or 0).

These elements are followed by a memory word giving the number of semaphore pool segments (2); followed by 2 memory words respectively giving the number of semaphores SN and SM, and 2 other memory words giving the SRAs of the first semaphores SN and SM in each semaphore pool segment; followed by 2 memory words giving the absolute addresses of 2 segments of type0 of the HSL table.

For example, size of the "firmware" area (103) can be maximized as needed, to 4 semaphore pool segments. But in reality, the HSL mechanism most often needs only 5,000 entries for the semaphores SN and 256 for the semaphores SM. It therefore requires only 2 semaphore pool segments to contain all the semaphores needed by HSL.

The value of the Validity field (or HslValidity) can have the following values:
  value 0 when the HSL mechanism is not operational;
  value 1 when the HSL mechanism is operational;
  value 2 to indicate that the shutdown of the HSL mechanism is in progress.

The segment number for the next allocation indicates, in the form of an integer from 0 to 3, the segment in which the next allocation request will be executed.

It should be clear to those well versed in the art that the present invention allows for embodiments in many other specific forms without going beyond the scope of application of the invention as claimed. Consequently, the present embodiments should be considered illustrative, but can be modified within the range defined by the scope of the attached claims, and the invention should not be limited to the details given above.

The invention claimed is:

1. In a hardware platform or computer system comprising one or more processors and storage means, at least part of said storage means comprising an addressable memory that can be used as a working memory, a method of communicating between at least two computer client processes executed at the same time,
  said client processes being executed in different operating systems chat manage the utilization of the system's resources by their respective client processes which are not directly compatible with one another, said method further comprising exchange steps, wherein reading and writing or modifying exchange data information is performed asynchronously by any of said client processes, in at least one common part of the addressable memory of the system, said common part comprising an exchange memory, said exchange data being structured into one or more software exchange objects, stored in the exchange memory, said exchange objects comprising at least one semaphore for storing a number of exchange operations performed on a software object by processes that do not directly know each other, the communication method further comprising a step for execution of at least one exchange engine process, wherein requests for exchange operations from at least one of the client processes are received outside of said common part of the addressable memory, by said at least one exchange engine, to centralize said requests for exchange operations for access to the exchange memory.

2. The method according to claim 1, wherein said step of modifying is performed by at least one of the client processes by accessing one or more locations in said exchange memory through data or addresses that represent, in a constant and unambiguous way, the position of said locations in at least part of the addressable memory of the hardware platform.

3. A method according to claim 2, wherein said step of modifying exchange data in the exchange memory is performed by at least one of the client processes without taking Into account a state or the availability of the other client process, or of the operating system of the other client process.

4. A method according to claim 3, wherein said at least one semaphore comprises at least one datum (COUNT) representing a current value of the at least one semaphore, said method further comprising a step of reading or testing of the state of said at least one semaphore by the client processes and a step of modifying of the state of said at least one semaphore through one or more exchange operations.

5. A method according to claim 3, including at least one interapplication manager process, for managing validity of requests for exchange operations using a client process, wherein said interapplication manager process is responsive to proprietary software, and comprising the following steps;
   detecting by the interapplication manager process a first event indicating that components implementing the communication method are available;
   sending by the Interapplication manager process to at least one client process capable of using exchange data, of information indicating that the components that implement the communication method are available;
   detecting by the interapplicacion manager process of a second event representing the end of availability of the components that implement the communication method; and
   sending by the interapplication manager process to at least one client process capable of using exchange data, information indicating that the components that implement the communication method must not be used.

6. A method according to claim 2, wherein the management of the utilization of the resources by a client process performed by at least one operating system, includes a step of sending of control data, called primitives, from said one operating system to proprietary software that manages the resources of the hardware platform for said one operating system, the communication method further comprising a step of execution, handled by said proprietary software, of at least one process called an exchange engine, which receives the requests for exchange operations from at least one of the client processes and manages the performance of said exchange operations by a process executed in the proprietary software.

7. A method according to claim 6, wherein said at least one semaphore comprising at least one datum (COUNT) representing a current value of the at least one semaphore, said method further comprising a step of reading or testing of the state of said at least one semaphore by the client processes and a step of modifying of the state of said ax least one semaphore through one or more exchange operations.

8. A method according to claim 2, wherein the exchange engine process which receives requests for exchange operations from at least one of the client processes handles them using a method comprising a continuous recursive repetition of the foUowing steps:
   waiting, by the exchange engine, for an event signaled by a requesting client process, and representing a request for an exchange operation;
   receiving data (HslOpOell) from the requesting process by the exchange engine, said data representing the exchange operation requested;
   exchanging, between the exchange engine and at least one process of said proprietary software, of information representing the exchange operation requested; and
   waiting, by the exchange engine, for an event representing the end of the processing by the proprietary software of the exchange operation.

9. A method according to claim 8, wherein said at least one semaphore comprising at least one datum (COUNT) representing a current value of the at least one semaphore, said method further comprising a step of reading or testing of the state of said at least one semaphore by the client processes and a step of modifying of the state of said at least one semaphore through one or more exchange operations.

10. A method according to claim 2, wherein said at least one semaphore comprising at least one datum (COUNT) representing a current value of the at least one semaphore, said method further comprising a step of reading or testing of tetstate of said at least one semaphore by the client processes and a step of modifying of the state of said at least one semaphore through one or more exchange operations.

11. A method according to claim 2, including at least one interapplication manager process, for managing validity of requests for exchange operations using a client process, wherein said interapplication manager process is responsive to proprietary software, and comprising the following steps:
   detecting by the interapplication manager process a first event indicating that components implementing the communication method are available;
   sending, by the interapplication manager process to at least one client process capable of using exchange data, of information indicating that the components that implement the communication method are available;
   detecting by the interapplicatlon manager process of a second event representing the end of availability of the components that implement the communication method; and
   sending, by the interapplicatlon manager process to at least one client process capable of using exchange data, information indicating that the components that implement the communication method must not be used.

12. A method according to claim 1, wherein said step of modifying exchange data in the exchange memory is performed by at least one of the client processes without taking into account a state or an availability of the other client process, or of the operating system of the other client process.

13. A method according to claim 12, wherein the management of the utilization of the resources by a client process performed by at least one operating system, includes a step of sending of control data, called primitives, from said one operating system to proprietary software that manages the resources of the hardware platform for said one operating system, the communication method further comprising a step of execution, handled by said proprietary software, of at least one process called an exchange engine, which receives the requests for exchange operations from at least one of the client processes and manages the performance of said exchange operations by a process executed in the proprietary software.

14. A method according to claim 13, wherein said at least one semaphore comprising at least one datum (COUNT) representing a current value of the at least one semaphore, said method further comprising a step of reading or testing of the state of said at least one semaphore by the client processes and a step of modifying the state of said at least one semaphore through one or more exchange operations.

15. A method according to claim 12, wherein the exchange engine process which receives requests for exchange operations from at least one of the client processes handles them using a method comprising a continuous recursive repetition of the following steps:
  waiting, by the exchange engine, for an event signaled by a requesting client process, and representing a request for an exchange operation;
  receiving data (HslOpCell) from the requesting process by the exchange engine, said data representing the exchange operation requested;
  exchanging, between the exchange engine and at least one process of said proprietary software, of information representing the exchange operation requested; and
  waiting, by the exchange engine, for an event representing the end of the processing by the proprietary software of the exchange operation.

16. A method according to claim 15, wherein said at least one semaphore comprising at least one datum (COUNT) representing a current value of the at least one semaphore, said method further comprising a step of reading or testing of the state of said at least one semaphore by the client processes and a step of modifying of the state of said at least one semaphore through one or more exchange operations.

17. A method according to claim 12, wherein said at least one semaphore comprising at least one datum (COUNT) representing a current value of the at least one semaphore, said method further comprising a step of reading or testing of the state of said at least one semaphore by the client processes and a step of modifying of the state of said at least one semaphore through one or more exchange operations.

18. A method according to claim 12, including at least one interapplication manager process, for managing validity of requests for exchange operations using a client process, wherein said interapplication manager process is responsive to proprietary software, and comprising the following steps;
  detecting by the interapplication manager process a first event indicating that components implementing the communication method are available;
  sending, by the interapplicacion manager process to at least one client process capable of using exchange data, of information indicating that the components that implement the communication method are available;

detecting by the incerapplication manager process of a second event representing the end of availability of the components that implement the communication method; and
  sending, by the interapplicatlon manager process to at least one client process capable of using exchange data, information indicating that the components that implement the communication method must not be used.

19. A method according to claim 1, wherein the management of the utilization of the resources by a client process performed by at least one operating system, includes a step of sending of control data, called primitives, from said one operating system to proprietary software environment that manages the resources of the hardware platform for said one operating system, the communication method further comprising a step of execution, handled by said proprietary software, of u least one process called an exchange engine, which receives the requests for exchange operations from a least one of the client processes and manages the performance of said exchange operations by a process executed in the proprietary software.

20. A method according to claim 19, wherein the exchange engine process which receives requests for exchange operations from at least one of the client processes handles them using a method comprising a continuous recursive repetition of the following steps:
  waiting, by the exchange engine, for an event signaled by a requesting client process, and representing a request for an exchange operation;
  receiving data (HslOpCell) from the requesting process by the exchange engine, said data representing the exchange operation requested;
  exchanging, between the exchange engine and at least one process of said proprietary software, of information representing the exchange operation requested; and
  waiting, by the exchange engine, for an event representing the end of the processing by the proprietary software of the exchange operation.

21. A method according to claim 20, wherein said at least one semaphore comprising at least one datum (COUNT) representing a current value of the at least one semaphore, said method further comprising a step of reading or testing of the state of said at least one, semaphore by the client processes and a step of modifying of the state of said at least one semaphore through one or more exchange operations.

22. A method according to claim 20, including at least one interapplication manager process, for managing validity of requests for exchange operations using a client process, wherein said interapplication manager process is responsive to proprietary software, and comprising the following steps:
  detecting by the interapplicadon manager process a first event indicating that components implementing the communication method are available;
  sending by the Interapplicatlon manager process to at least one client process capable of using exchange data, of information indicating that the components that implement the cormunicarion method are available;

23. A method according to claim 19, wherein said at least one semaphore comprising at least one datum (COUNT) representing a current value of the at least one semaphore, said method further comprising a step of reading or testing of a state of said at least one semaphore by the client processes and a step of modifying of the state of said at least one semaphore through one or more exchange operations.

24. A method according to claim 19, including at least one interapplication manager process, for managing validity of requests for exchange operations using a client process, wherein said interapplication manager process is responsive to proprietary software, and comprising the following steps:
- detecting by the interapplication manager process a first event indicating that components implementing the communication method are available;
- sending by the interapplication manager process to at least one client process capable of using exchange data, of information indicating that the components chat implement the communication method are available;
- detecting by the interupplication manager process of a second event representing the end of availability of the components that implement the communication method; and
- sending by the interappication manager process to at least one client process capable of using exchange data, information indicating that the components that implement the communication method must not be used.

25. A method according to clam 1, wherein said at least one semaphore comprising at least one datum (COUNT) representing a current value of the at least one semaphore, said method further comprising a step of reading or testing a state of said at least one semaphore by the client processes and a step of modifying of the state of said at least one semaphore through one or more exchange operations.

26. A method according to claim 25, wherein a client process, transmits a requesting process, for modification of an exchange object through one or more exchange operations comprising the following steps:
- the requesting process for modification of at least one instruction requesting a reservation of an exchange object being for the sole use of said requesting process and including at least;
- one instruction requesting the modification of said exchange object; and
- at least one instruction requesting that said exchange object again be made available to all of the other client processes.
- sending, by the interapplication manager process to at least one client process capable of using exchange data, information indicating that the components that implement the communication method must not be used.

27. A method according to claim 25, including at least one interapplication manager process, for managing validity of requests for exchange operations using a client process, wherein said interapplication manager process is responsive to proprietary software, and comprising the following steps:
- detecting by the interappilcation manager process a first event indicating that components implementing the communication method are available;
- sending, by the interappilcation manager process to at least one client process capable of using exchange data, of information indicating tha the components that implement the communication method are available;
- detecting by the interapplicatlon manager process of a second event representing the end of availability of the components that implement the communication method; and
- sending, by the interapplication manager process to at least one client process capable of using exchange data, information indicating that the components that implement the communication method must not be used.

28. A method according to claim 1, including at least one interapplication manager process, for managing validity of requests for exchange operations using a client process, wherein said interapplication manager process is responsive to proprietary software, and comprising the following steps:
- detecting by the interapplication manager process a first event indicating that components implementing the communication method are available;
- sending, by the interapplication manager process to at least one client process capable of using exchange data, of information indicating that the components that implement the communication method are available;
- detecting by the interapplication manager process of a second event representing the end of availability of the components that implement the communication method; and
- sending, by the interapplication manager process to at least one client process capable of using exchange data, of information indicating that the components that implement the communication method must not be used.

29. A method according to claim 1, wherein at least one operating system is a software environment con)patible with a first proprietary operating system, the first proprietary system comprising at least one proprietary environment functioning as a virtual machine executed by one or more computer systems.

30. A method according to claim 29, wherein the virtual machine is executed by an operating system compatible with a graphical user interface type operating system.

31. A method according to claim 1, wherein at least one operating system is a software environment compatible with a first proprietary operating system, the first proprietary system comprising at least one proprietary environment functioning directly on a hardware platform adapted to one of the operating systems.

32. A method according to claim 1, wherein at least one client process is executed by one of a plurality of operating systems.

33. A method according to claim 1, wherein a High Speed Link (HSL) process is used by said at least one exchange engine.

* * * * *

UNITED STATES PATENT AND TRADEMARK OFFICE
CERTIFICATE OF CORRECTION

PATENT NO. : 7,299,476 B2 Page 1 of 1
APPLICATION NO. : 10/445325
DATED : November 20, 2007
INVENTOR(S) : Robert Baudry, Michel LeCampion and Michel Tuilliere It is certified that error appears in the above-identified patent and that said Letters Patent is hereby corrected as shown below:

Column 22, Line 11, please delete "ax" and replace with --at--.

Column 22, Line 17, please delete "foUowing" and replace with --following--.

Column 22, Line 21, please delete "(Hs1OPOell)" and replace with --(HS1OPCell)--.

Column 23, Line 1, please delete "incerapplication" and replace with --interapplication--.

Column 24, Line 17, please delete "a" and replace with --at--.

Column 24, Line 57, please delete "cormunicarion" and replace with --communication--.

Column 25, Line 8, please delete "chat" and replace with --that--.

Column 26, Line 31, please delete "con)patible" and replace with --compatible--.

Signed and Sealed this

Fifteenth Day of April, 2008

JON W. DUDAS
*Director of the United States Patent and Trademark Office*